Aug. 23, 1949.   J. K. BRIXIUS   2,479,722
FILTER CONSTRUCTION
Filed Jan. 8, 1945
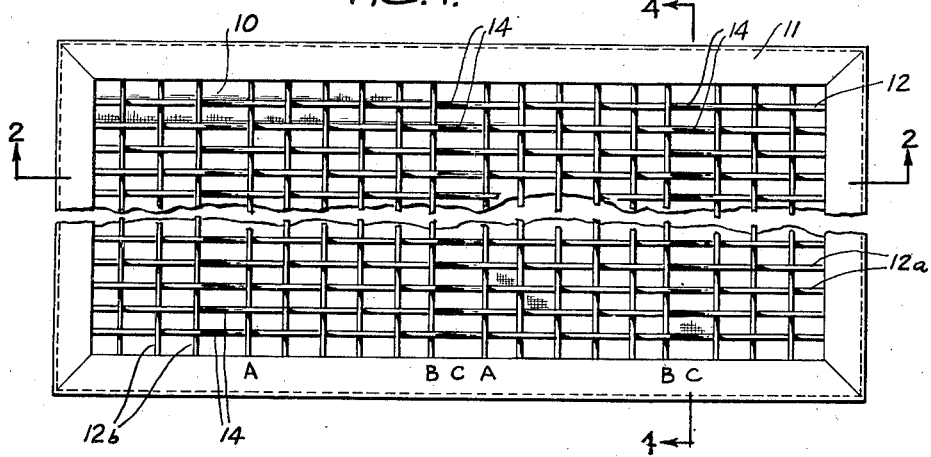
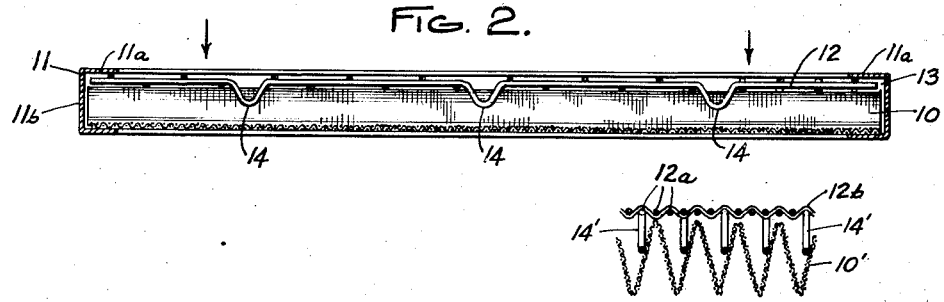
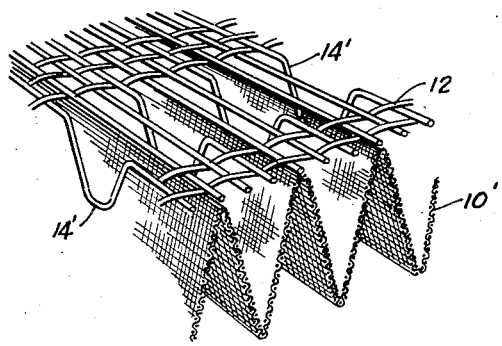
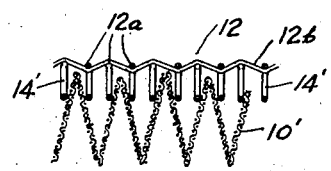
INVENTOR
JACOB K. BRIXIUS
By Hyde and Meyer
ATTORNEYS.

Patented Aug. 23, 1949

2,479,722

UNITED STATES PATENT OFFICE 2,479,722

FILTER CONSTRUCTION

Jacob K. Brixius, Cleveland, Ohio, assignor to Air-Maze Corporation, Cleveland, Ohio, a corporation of Delaware Application January 8, 1945, Serial No. 571,766

3 Claims. (Cl. 183—71)

This invention relates to an improved filter construction and more particularly to a means for holding a filter element in place in a holding frame combined with a protective screen across one face of the element.

An object of the present invention is to provide a screen, grating, or the like across one face of a filter element either for the purpose of protecting the element against damage or for the purpose of arresting lint or other large particles combined with the function of a portion of the screen or grating entering into the filter material for the purpose of properly positioning the same.

Another object of the present invention is to provide a novel screen across a face of a filter element comprising a sheet of filter material folded in a series of parallel zig-zag folds and wherein portions of the screen enter between the zig-zag folds for properly positioning the latter.

Other objects of the invention include the spacing of the filaments of the protecting screen in a manner coordinate with the distance between the zig-zag folds of the filter element so as to provide a specific spacing of the folds, and the provision of a specially woven protecting screen element adapted to have portions thereof bent down into the filter element for providing position means in a cheap and efficient manner. Other objects and advantages of the present invention will be apparent in the accompanying description and drawings, and the essential features will be summarized in the claims.

In the drawings,

Fig. 1 is a plan view of a filter panel constructed according to my invention;

Fig. 2 is a transverse sectional view taken along the line 2—2 of Fig. 1;

Fig. 3 is a perspective view enlarged of a fragment of the device of Fig. 1;

Fig. 4 is a fragmental sectional view slightly enlarged taken in the general position of the line 4—4 of Fig. 1 but showing a modified spacing of the wire loops entering between the zig-zag folds; and Fig. 5 is a view similar to Fig. 4 showing another modification of the spacing of the loops of the protecting screen.

In Figs. 1 and 2, I have shown one form of my device wherein a filter element 10 is held within a frame 11, the frame being channel-form in section as best seen in Fig. 2. A protective screen or grating 12 is provided across one face of the filter element. This may be of any stiff deformable material such as the heavy wire screen formed of metal as indicated in Figs. 1 and 2.

The filaments 12a run in one direction, and the crossing filaments 12b are woven over and under the filaments 12a and in the form shown at right angles thereto. The ends of the filaments 12a and 12b rest beneath the flanges 11a of the frame and are only slightly spaced as indicated at 13 from the web 11b of the channel frame. Thus there is little possibility of movement of the screen 12 with respect to the frame 11. It will be understood that the complete assembly is made as shown in Figs. 1 and 2 after which the corners of the frame are secured together to hold everything in place.

The general formation of the screen 12 provides sufficient crossing filaments or other thin structural members to protect the filter element against damage or in some cases to catch lint or other large particles and prevent them entering the filter material 10 when the gaseous stream to be filtered flows in the direction of the arrows indicated in Fig. 2. In any case, certain portions of the screen 12 as indicated by the loops 14 are bent out of the general plane of the screen 12 to enter into the filter material 10 and hold the same properly spaced so as to prevent the filter material packing in any one portion of the panel making certain portions denser than other portions so that the filtering efficiency is not uniform over the entire face of the panel.

I envision that the device just described may be used generally for holding filter material 10 in proper position over the face of a large filter panel regardless of the kind of filter material used. A specific application of my invention is disclosed wherein the filter material comprises a sheet as shown at 10′, Fig. 3, this sheet being of foraminous material folded in zig-zag form providing a plurality of folds as thereshown. This sheet 10′ might be paper or cloth, stiffened where necessary, plastic material, or metal. The protecting screen 12 is placed across the crests of the zig-zag folds and integral portions of the screen member 12 as indicated at the loops 14′ are bent downwardly out of the plane of screen 12 and between the zig-zag folds of the filter material 10′.

Various arrangements of the loops 14 or 14′ are possible in connection with the zig-zag folded material. In Fig. 4, the filaments 12a run parallel to the zig-zag folds of the filter material 10′, and every third filament 12a has a loop 14′ bent downwardly, the spacing of the filaments 12a being so coordinated with the spacing of the zig-zag folds that each loop 14′ presses against one side of a zig-zag fold, thus very accurately positioning these folds. It will be understood that the dimension across one of these panels may be of the order of one to three feet, and the folded material would not maintain accurate spacing unless some positioning means were provided as illustrated herein. Those skilled in this art will appreciate that the number of zig-zag folds in the material 10' must be accurately spaced per unit of distance across the face of the panel if the resistance to flow and the efficiency of filtering is to be accurately controlled.

In Fig. 5, I have shown another modification wherein each of the filaments 12a has a loop 14' bent downwardly out of the plane of the screen 12 and entering between the zigzag folds, the coordination between the spacing of the filaments 12a and the spacing of the zig-zag folds 10' being such that a loop 14' rests on each side of each crest of each fold of the filtering material. This arrangement provides an even more accurate positioning of the zig-zag folds. For illustration, if it is desired to have the folds of the material 10' in Fig. 5 arranged with three folds or crimps per inch of distance across the panel, then the screen 12 may be woven of material six meshes to the inch which will provide the construction illustrated in Fig. 5.

It will be noted that I have provided material which is very cheaply constructed because the screen 12 may be woven on looms of known type with the warp wires 12a and the weft wires 12b, the latter being woven equally spaced apart, for instance, between the points A and B indicated on Fig. 1 and more widely spaced at the points marked C. Then at the portions C, the loops 14 or 14' may be formed by bending the filament 12a out of the general plane of screen 12. When formed in this fashion, the screen 12 provides a very efficient lint arrester while at the same time accurately positioning the filter element 10.

While I have shown the protecting screen 12 across one face of the filter panel, it will be understood that a similar protecting screen may be placed on both the upstream and downstream faces of the panel if desired.

What I claim is:

1. In combination, a frame, a filter element in said frame comprising stiff sheet material folded in a series of parallel zig-zag folds, there being a predetermined number of said folds per unit of distance across the face of said element, a screen of woven stiff filaments extending in a general plane across one face of said element and in substantially fixed relation to said frame, some of said filaments being parallel to said folds and other of said filaments in crossed relationship, and a portion of said parallel filaments only coordinated in number with the number of said folds being bent out of said plane and between said folds for holding the latter in position.

2. In combination, a frame, a filter element in said frame comprising sheet material folded in a series of parallel zig-zag folds, there being a predetermined number of said folds per unit of distance across the face of said element, a coarse screen of woven stiff filaments extending in a general plane across one face of said element and in substantially fixed relation to said frame, said screen having filaments parallel to the ridges of said folds and so spaced that two such filaments lie on either side of said folds when the latter are regularly spaced, and said parallel filaments bent out of said plane and into engagement with opposite sides of each of said folds for holding the latter in position.

3. In combination, a filter element comprising a porous sheet folded in a series of parallel zig-zag folds, a screen extending in a general plane across the crests of said folds, said screen having filaments parallel to the crests of said folds and other crossing filaments, said crossing filaments being spaced farther apart at one zone than at others, and said parallel filaments only at said one zone being bent out of said plane and between said folds and into engagement with some of them for holding them in position.

JACOB K. BRIXIUS.

REFERENCES CITED

The following references are of record in the file of this patent:

UNITED STATES PATENTS

| Number | Name | Date |
|---|---|---|
| 1,863,015 | Kamrath | June 14, 1932 |
| 1,880,552 | Ward | Oct. 4, 1932 |
| 1,883,715 | Greene | Oct. 18, 1932 |
| 2,002,936 | Davies | May 28, 1935 |
| 2,050,508 | Strindberg | Aug. 11, 1936 |
| 2,074,294 | Woodruff | Mar. 16, 1937 |
| 2,405,293 | Dahlman | Aug. 6, 1946 |